US008949259B2

(12) United States Patent
Brei

(10) Patent No.: US 8,949,259 B2
(45) Date of Patent: Feb. 3, 2015

(54) SYSTEMS, METHODS, SOFTWARE, AND INTERFACES FOR ANALYZING, MAPPING, AND DEPICTING SEARCH RESULTS IN A TOPICAL SPACE

(75) Inventor: James E. Brei, Milford, MI (US)

(73) Assignee: Cengage Learning, Inc., Stamford, CT (US)

( * ) Notice: Subject to any disclaimer, the term of this patent is extended or adjusted under 35 U.S.C. 154(b) by 1466 days.

(21) Appl. No.: 11/469,426

(22) Filed: Aug. 31, 2006

(65) Prior Publication Data

US 2007/0150451 A1 Jun. 28, 2007

Related U.S. Application Data

(60) Provisional application No. 60/713,115, filed on Aug. 31, 2005.

(51) Int. Cl.
*G06F 7/00* (2006.01)
*G06F 17/30* (2006.01)

(52) U.S. Cl.
CPC .... *G06F 17/30864* (2013.01); *G06F 17/30651* (2013.01); *G06F 17/30696* (2013.01)
USPC .......................................................... 707/758

(58) Field of Classification Search
USPC ........................................................ 707/758
See application file for complete search history.

(56) References Cited

U.S. PATENT DOCUMENTS

| 5,608,899 | A | * | 3/1997 | Li et al. ................................ 1/1 |
| 6,385,602 | B1 | | 5/2002 | Tso et al. |
| 6,460,049 | B1 | | 10/2002 | Becker et al. |
| 2002/0174115 | A1 | * | 11/2002 | shibuya et al. .................... 707/3 |
| 2003/0050927 | A1 | | 3/2003 | Hussam |

FOREIGN PATENT DOCUMENTS

| WO | WO 98/49637 A | 11/1998 |
| WO | WO-98/49637 A1 | 11/1998 |
| WO | WO-02/41190 A2 | 5/2002 |

OTHER PUBLICATIONS

"International Search Report for corresponding PCT Application No. PCT/US2006/034220", (Dec. 4, 2006), 3 pgs.
PCT International Preliminary Report on Patentability for counterpart PCT International Application No. PCT/US/2006/034220; Mar. 13, 2008; 5 pgs; International Bureau of WIPO, Geneva, Switzerland.

* cited by examiner

*Primary Examiner* — Truong Vo
(74) *Attorney, Agent, or Firm* — Edwards Wildman Palmer LLP; Howard M. Gitten

(57) ABSTRACT

The present inventor devised, among other things, information retrieval systems, methods, software, and related interfaces that help users assess and if necessary bolster the quality of their manual selections from search results. One exemplary system receives a set of documents selected from search results for an input query, identifies key subjects in the selected documents, and outputs a graphic, such as a pie chart, that shows not only how well these selected documents relate to the query, but also whether there are gaps in the topical scope of the selected documents related to the input query.

6 Claims, 5 Drawing Sheets

MyMarked List

[Email List]    410    [Show Citations]    420    [Analyze Coverage: Piezoelectric Transducer ▼]

Piezoelectric work pushes transducers.
*Electronics Weekly* Sept 10, 2003 p20 (279 words)

Scientists uncover basis of material oddball. (Electric Foam)(piezoelectric materials) P. Weiss.
*Science News* August 9, 2003 v164 i6 p86(1) (363 words)

Piezoelectric sensor: 6-mm button-style unit. (Product News)
*Instrumentation & Automation News* August 2003 v51 i8 p21(1) (80 words)

Piezoelectric accelerometer. (Product News). (from Columbia Research Laboratories Inc.)(Brief Article) Melanie Martella.
*Sensors Magazine* July 2003 v20 i7 p48(1) (73 words)

References

Thomas Directory

Smart Material Bulletin

Journals

Journal of Micro Electrical Mechanical Systems (MEMS)

Smart Materials and Structures

Best of the Web

Piezoelectric Transducers

Polymer PZT for Hearing Aids

FIGURE 4

SYSTEMS, METHODS, SOFTWARE, AND INTERFACES FOR ANALYZING, MAPPING, AND DEPICTING SEARCH RESULTS IN A TOPICAL SPACE

CROSS-REFERENCE TO RELATED APPLICATIONS

This application claims priority to U.S. provisional application 60/713,115 which was filed on Aug. 31, 2005, and which is incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2005, Thomson Global Resources

TECHNICAL FIELD

Various embodiments of the present invention concern information retrieval systems and methods of presenting search results in information retrieval systems, particularly online information retrieval systems.

BACKGROUND

The growth in popularity of the Internet and other computer networks has fueled not only an increasing availability, but an increasing appetite among consumers for digital information. Consumers typically seek access to this information using an access device, such a computer, to communicate with an online information retrieval system. The information retrieval system typically includes a graphical user interface for entering and submitting requests for information, known as queries, to a remote search engine. The search engine identifies relevant information, typically in the form of documents, and returns a results list to the access device, enabling the user to access one or more of the listed documents.

One problem that the present inventor recognized in conventional information retrieval systems concerns the identification of information within search results. Conventional systems are generally focused on presenting the user with any and all results that match their queries, leaving users to figure out which documents among thousands or millions of documents best meet their needs. Users typically browse the results, select some for use, and discard the vast majority. This process is typically manual and the users generally have little or no sense of how good their selections are or even how good their initial set of search results were. Indeed, users typically take it on faith that the search technology provided quality results in relation to their search term(s).

Accordingly, the inventor has identified a need for tools that assist users in assessing and improving the quality of the documents they select from search results.

SUMMARY

To address this and/or problems, the present inventor devised, among other things, information retrieval systems, methods, software, and related interfaces that help users assess and if necessary bolster the quality of their manual selections from search results. One exemplary system receives a set of documents selected from search results for an input query, identifies key subjects in the selected documents, and outputs a graphic, such as a pie chart, that shows not only how well these selected documents relate to the query, but also whether there are gaps in the topical scope of the selected documents related to the input query. Moreover, in some embodiments, the graphic serves as a user interface, with each coverage gap selectable to initiate a query for documents to fill the gap.

BRIEF DESCRIPTION OF THE DRAWINGS

FIG. 4 is a facsimile of a graphical user interface 400 which corresponds to one or more embodiments of the invention.

DETAILED DESCRIPTION OF EXEMPLARY EMBODIMENT(S)

This description, which not only references and incorporates the above-identified Figures, but also incorporates the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
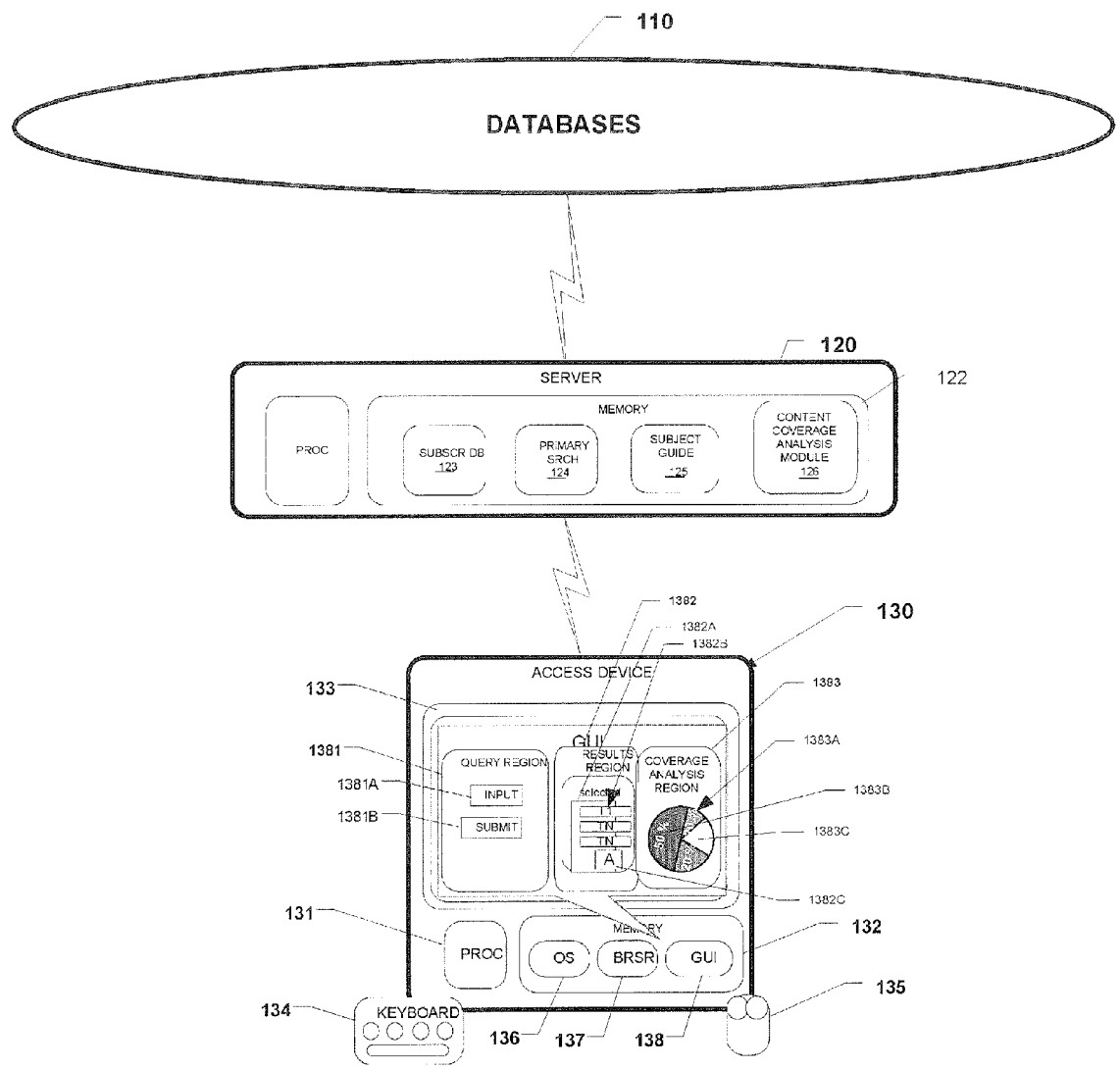
FIG. 1 is a block diagram of an exemplary information retrieval system 100 which corresponds to one or more embodiments of the invention.

FIG. 1 shows an exemplary online information-retrieval system 100, which may be adapted to incorporate the capabilities or functions described above. System 100 includes one or more databases 110, one or more servers 120, and one or more access devices 130.

Databases 110 includes one or more separate databases, which take the exemplary form of one or more electronic, magnetic, or optical data-storage devices, include or are otherwise associated with respective indices (not shown). Each of the indices includes terms and phrases in association with corresponding document addresses, identifiers, and other conventional information. In some embodiments, databases 110 includes documents related to caselaw, statutes, financial, scientific, health-care information. Still other embodiments provide public or private databases, such as those made available through INFOTRAC. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a search module 124, subject guide module 125, and a coverage analysis module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, and subject guide module 125, and coverage analysis module 126. (In some embodiments, one or more of the contents of memory 122, for example, subject guide module 125 and/or coverage analysis module 126, may be replicated or stored exclusively in access device 130.)

Subscriber database 123 includes subscriber-related data for controlling, administering, and managing pay-as-you-go or subscription-based access of databases 110. In some database 123 includes user-specific information regarding passwords and user preferences.

Search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Subject guide module 125 includes subject guide data representative of the contents of one or more of databases 110. In the exemplary embodiment, exemplary subject matter data includes one or more subject area identifiers for each of the documents in one or more of databases 110. Additionally, some embodiments provide primary and secondary subject area identifiers for the documents, indicating relative degree of importance of the corresponding subject areas in the corresponding documents.

Coverage-analysis module 126 includes machine readable and/or executable instruction sets for identifying the key subjects in a set of selected documents and defining a graphical user interface that shows quantitatively how well these selected documents relate to the topical scope defined by the query. The graphical user interface, which is described further below, is transmitted over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 having one or more processors (or processing circuits), a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120 to implement the interfaces shown above or elsewhere in this description.)

In the exemplary embodiment, each of these control features takes the form of a hyperlink or other browser-compatible command input, and provides access to and control of a query region 1381, a search-results region 1382, and a coverage analysis region 1383. Although FIG. 1 shows region 1381, 1382, and 1383 as being simultaneously displayed, some embodiments present them at separate times.

Query region 1381 includes a query input or definition region 1381A and a query submission feature 1381B. Query input region 1381A enable a user to input a query, for example in the form of one or more key words or phrases with or without Boolean operators. Query submission feature 1381B is user operable to initiate submission of the query defined in input region 1381A to a server, such as server 120, for handling.

Search-results region 1382 includes a search result listing 1382A of one or more documents, each of which is associated with a user operable selection feature (not visible), such as a check box or radio button. Activation of the selection features for one or more of the documents in search result listing 1382A defines a selected set of search result documents 1382B. User selection of the control features in region 1382 result in retrieval and display of at least a portion of the corresponding document within a region of interface 138 (not shown in this figure.) Search-results region 1382 also includes a coverage analysis feature 1382C which is selectable to invoke analysis of the coverage afforded by selected set of search result documents 1382B and display of coverage analysis region 1383.

Coverage analysis region 1383 includes an interactive pie-type coverage analysis graphic 1383A, which depicts the key topics covered by the selected documents in relation to the topical space defined by the input query, as well as areas that are not covered. Uncovered topical subspaces are selectable via a single click to initiate searches of databases 110 (or other the unselected search results documents) for documents that match the missing key topics. Further description of the interactivity of the graphic and the coverage analysis module is provided below.

Exemplary Method(s) of Operation

Figure 2:
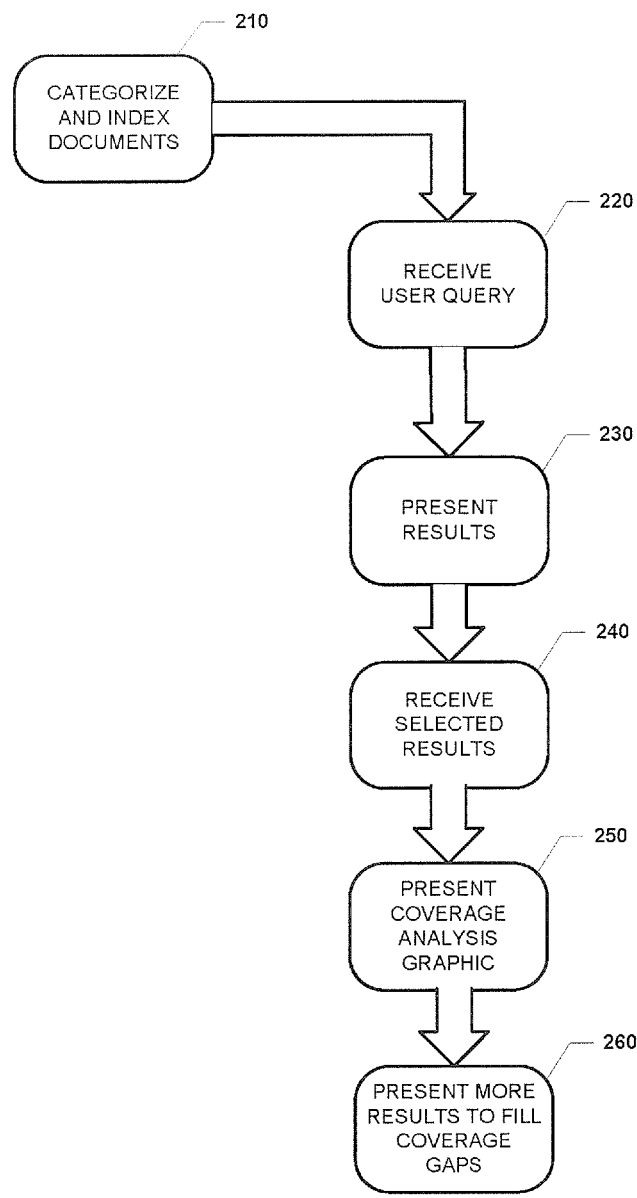
FIG. 2 is a flow chart of an exemplary method of operation which corresponds to one or more embodiments of the invention.

FIG. 2 shows a flow chart 200 of one or more exemplary methods of operating an information-management system, such as system 100. Flow chart 200 includes blocks 210-260, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

In block 210, the method begins with collecting subject matter information from documents in one or more databases. In the exemplary embodiment, this entails building a master subject matter guide for databases 110 based on conventional indexing and classification or categorization techniques. Category or subject matter data is stored in both the document and in the master subject guide which is stored in server 120. Execution continues at block 220.

Block 220 entails receiving a user query. In the exemplary embodiment, this entails a user using a browser application to couple her access device to server 120, logging into the system using appropriate login credentials. With successful login, server 120 outputs one or more instructional or programmatic elements to define a graphical use interface, such as interface 138, on a display associated with the access device. The user then defines and submits a query, such "piezoelectric transducer" via interface 138 to server 120. Execution then proceeds to block 230.

Block 230 entails presenting search results. In the exemplary embodiment, presentation of the search results entails server 120 searching one or more of databases 110 based on the received user query and transmitting the search results to access device 130. The search results are then rendered as part of interface 138, specifically search results region 1382.

Figure 3:
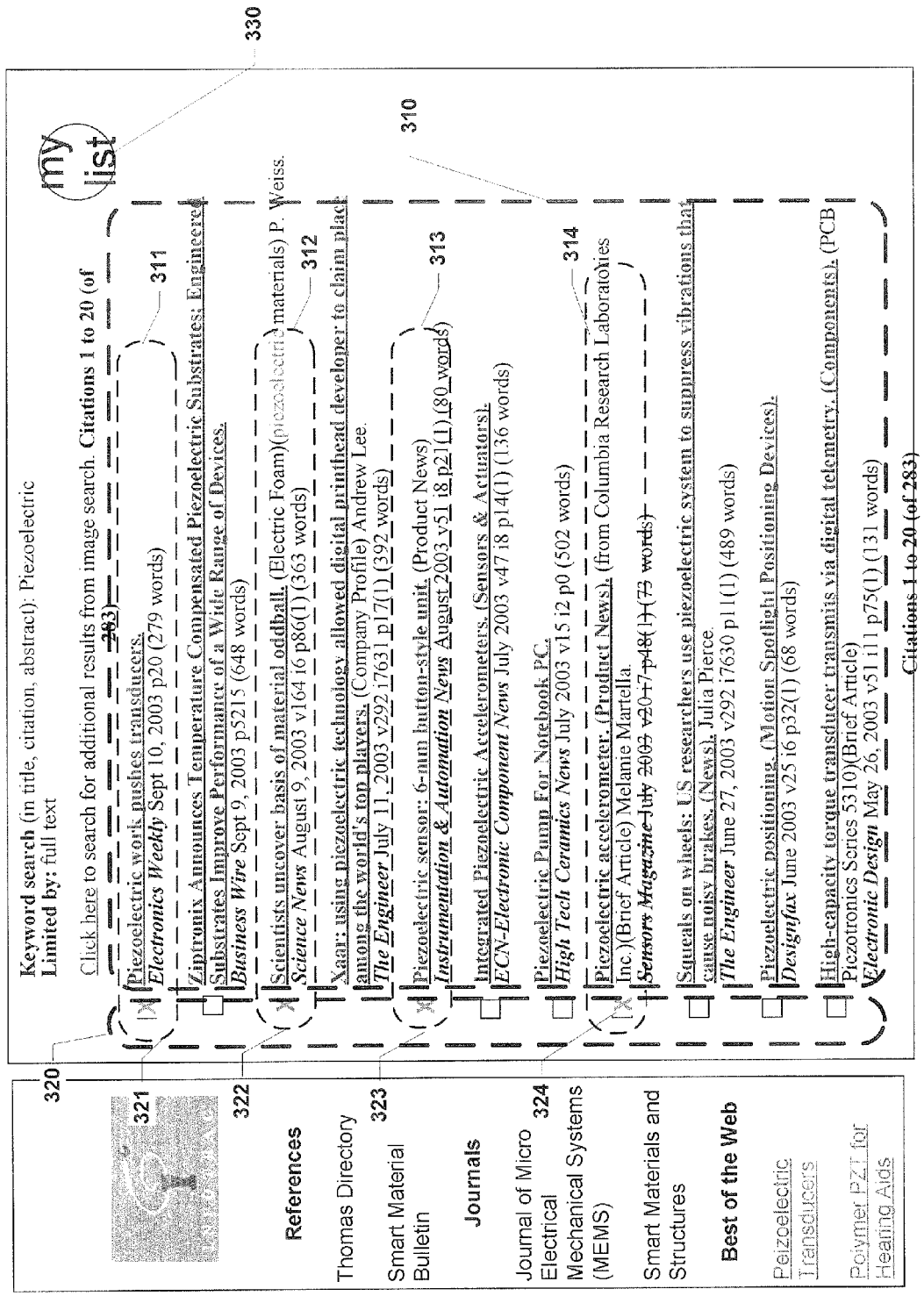
FIG. 3 is a facsimile of a graphical user interface 300 which corresponds to one or more embodiments of the invention.

FIG. 3 shows an exemplary interface 300, which includes a portion of the search results for "piezoelectric transducer." Interface 300 includes a search result listing 310, selection features 320, selection command feature 330. Search result listing 310 includes document listings 311, 312, 313, and 314 which have been selected via respective selection features 321, 322, 323, and 324. In the exemplary embodiment each of these selection features take the form of check box. Selection command feature 330 is user operable to isolate and present the selected search results in a separate interface, such as interface 400 in FIG. 4, which shows the selected search results in a region 410 and includes an analyze-coverage command feature 420 that initates communication of the selected results to server 120.

Next, as FIG. 2 shows, the exemplary method executes block 240, which entails receiving the selected search results. To this end, the exemplary embodiment receives the selected results at server 120. Execution continues at block 250.

Block 250 entails presenting a coverage analysis graphic based on the selected search result documents. In the exemplary embodiment, this entails server 120, or more precisely coverage analysis module 126, extracting and analyzing key subjects from the selected documents. In some instances, the documents themselves may include the key subject information embedded as metadata or appended to the document. In other instances, the key subject information may be included as part of a subject guide data structure that is logically associated with a document identifier for each document in databases 110. In yet other instances, the key subject information may be extracted on the fly in response to receipt of the request for a coverage analysis.

Once the key subject or topics are extracted, they can be analyzed in relation to the master subject guide and/or the input query, facilitating presentation of the subject areas represented by the selected documents in the context of a topical or subject map for the input query. For example, there are six subject areas for Heart Attack (Cardiac Arrest): Coronary Vasospasm, Coronary Pulmonale, Myocardial Ischema, Myocardial Infarction, Cardiogenic Shock, Angina Pectoris. In one embodiment, this means that the pie or other graphic has six sectors or regions, one for each subject matter. If the input query is Heart Attack, and five of the selected search results documents have Coronary Pulmonale as the primary term and one of the selected documents has Myocardial Infarction is a secondary term, then the coverage analysis graphic would identify that Coronary Pulmonale is covered well, Myocardial Infarction is nominally covered (1/6 or 1/12 depending how one chooses to score a secondary mention) and that four potential subject areas are not covered at all (0/6).

Figure 5:
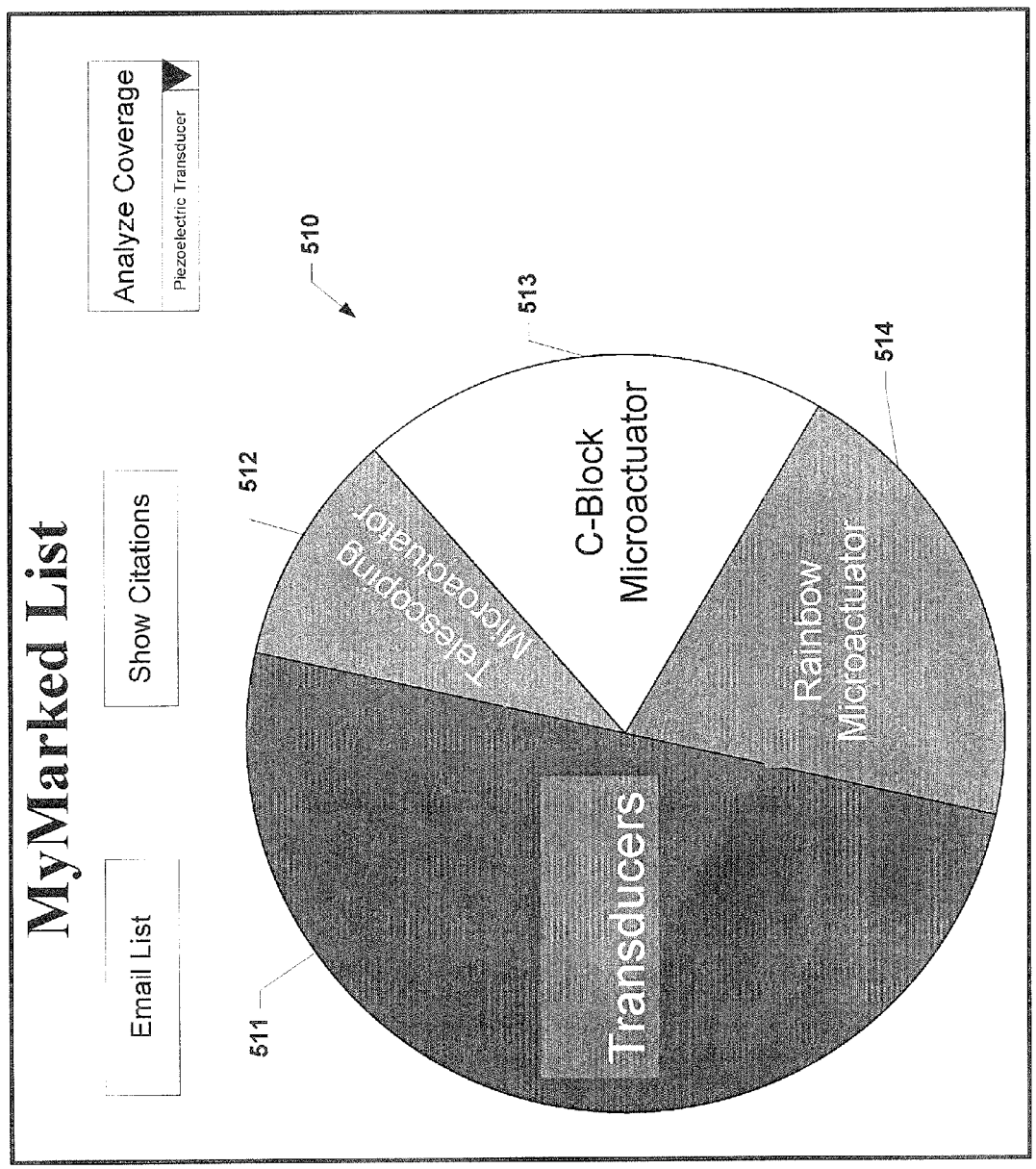
FIG. 5 is a facsimile of a graphical user interface 500 which corresponds to one or more embodiments of the invention.

FIG. 5 shows an exemplary interface 500 which includes an interactive coverage analysis pie graphic 510 for the selected results of the piezoelectric transducer search. Graphic 510 includes a transducer region 511 (50%), a telescoping microactuator region 512 (10%), a c-block microactuator region 513 (20%), and a rainbow microactuator region 514 (20%), indicating that the selected results provide full coverage of the topic space defined by the piezoelectric transducer query. In some embodiment, one or more sectors of the pie graph are color coded, for example, red to indicate that there is zero or less than some threshold amount of coverage for the corresponding subject area.

FIG. 2 shows that after block 250, execution continues at block 260 with presentation of additional search results to fill coverage gaps identified in the coverage analysis graphic. In the exemplary embodiment, this entails a user clicking on or selecting a portion of a coverage analysis graph that indicates zero or less than some threshold amount of subject area coverage in a selected set of results. This selection activates an associated hyperlink that has an embedded query command with the underrepresented subject area term(s). The hyperlink targets server 120, which in turn responds by executing a search based on the query and returns search results to access device 130.

In many cases, users do not fully read their selected documents (or articles), nor do they necessarily understand the differences between terms in the articles. To help the user understand the concepts of coverage a graphical approach such as a split Pie Chart showing the areas of coverage with a quality indication and the areas of non-coverage where the user can simply click on the slice to launch a targeted search for that area. The search technology promises to aid both novice and expert users who wish to quickly analyze content for applicability as well as completeness.

Other Visualization Approaches

The exemplary embodiment is generally directed to helping users quickly assimilate large quantities of content and select the best, most relevant, content to apply to their work. Although the exemplary embodiment presents a pie chart as a visual tool for quickly assessing topical coverage, many different visual techniques for assessing topical coverage are feasible. Indeed, some embodiments include several selectable visualization options for users to select, including defining one of the options as a default preference. Other visualization options include: decomposing the key topics from the selected documents and displaying them in relation to each other in a tree structure; displaying various abstracts of the text, such as 25 word abstract, 5 most significant words, 3 most significant sentences, etc.; decomposing the key topics from the selected documents, prompting the user for a topic word (other than the search term), and then showing the key topics in relationship to the user-provided topic word; and displaying the selected articles and their key topics or themes in time orientation.

Conclusion

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents

The invention claimed is:

1. An information retrieval system comprising:
   a server computer interfacing with a database;
   an access device interfacing with the server;
   a user interface module running on the server and configured to receive a query from the access device, query the database, and return a set of search results to the access device based on the received query;
   a user-operable selection feature integrated into the user interface module and configured to send a user-selected subset of the search results to the server; and
   a coverage analysis module interfacing with the server and the access device and configured to extract and analyze key subjects from documents in the database corresponding to the subset of search results;
   wherein the coverage analysis module is configured to display a topical map via the access device, the topical map showing the extent to which the documents cover the topic space defined by the query.

2. The system of claim 1, wherein the topical map comprises a plurality of regions corresponding to subject areas associated with the query and at least one of the regions is user selectable to initiate a search for content that is not represented in the selected portion of the search results.

3. The system of claim 1, wherein the topical map has the form of a pie graph.

4. The system of claim 3, wherein the user-selected subset of the search results omits content corresponding to at least one of the subject areas associated with the query and wherein a region in the topical map corresponding to the one of the subject areas is user selectable to initiate a search for the omitted content.

5. A computer implemented method of providing coverage analysis of user selected information, comprising:
   receiving a query in a database;
   receiving a user-selected portion of search results in the database based on the received query;
   extracting and analyzing key subjects from documents in the database corresponding to the user-selected portion of search results; and
   displaying, on an output device, a topical map showing the extent to which the documents cover the topic space defined by the query.

6. An information retrieval system comprising:
   a server computer interfacing with a database;
   an access device interfacing with the server;
   a subject guide module interfacing with server and the database to build a master subject guide for the database, wherein the master subject guide includes a data structure that is logically associated with a document identifier for each document in the database;
   a user interface module running on the server and configured to receive a query from the access device, query the database, and return a set of search results to the access device based on the received query;
   a user-operable selection feature integrated into the user interface module and configured to send a user-selected subset of the search results to the server; and
   a coverage analysis module interfacing with the server, the access device and the subject guide module, the coverage analysis module being configured to extract and analyze key subjects from documents in the database corresponding to the subset of search results and compare the key subjects to the master subject guide;
   wherein the coverage analysis module is configured to display a topical map via the access device, the topical map showing the extent to which the documents cover the topic space defined by the query, as determined by the master subject guide.

* * * * *